A. C. Rand,
Pitcher Protector,
N° 63,653. Patented Apr. 9, 1867.

Witnesses:

Inventor:
Alonzo C. Rand

United States Patent Office.

ALONZO C. RAND, OF UNION MILLS, PENNSYLVANIA.

Letters Patent No. 63,653, dated April 9, 1867.

---

IMPROVED MODE OF PROTECTING CHINA, GLASS, AND OTHER ARTICLES.

---

The Schedule referred to in these Letters Patent and making part of the same.

---

TO ALL WHOM IT MAY CONCERN:

Be it known that I, ALONZO C. RAND, of Union Mills, county of Erie, and State of Pennsylvania, have invented a new and improved Mode of Protecting China, Glass, Porcelain, or Earthen Wares from becoming injured or broken on their bottoms or rests, and hereby declare that the following is a full and exact description thereof, reference being had to the accompanying drawings, and letters of reference marked thereon.

Similar letters of reference indicate corresponding parts in the same figures.

The nature of my invention consists in attaching rubber or gutta percha to the bottoms of porcelain, glass, china, or stone ware, for the purpose of forming elastic rests, whereby they are protected from being injured or injuring other articles coming in contact with them.

To enable others skilled in the art to make and use my invention, I will proceed to describe its construction and operation.

Figure 3:
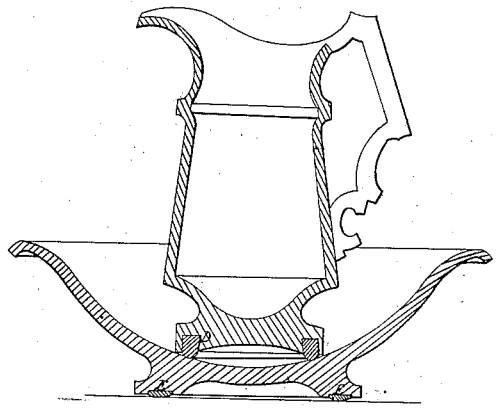
Figure 3 represents a vertical section of a modification of the same improvement applied to a wash-bowl and pitcher.
Figure 1:
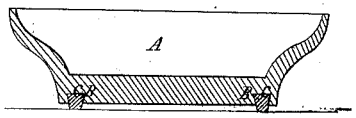
Figure 1 represents a vertical section of an article of china-ware exhibiting my improvement.
Figure 2:
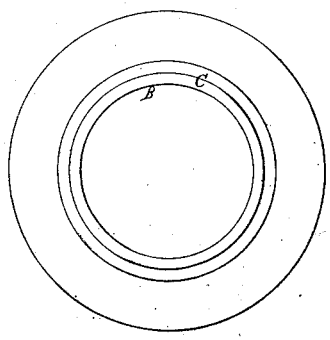
Figure 2 is an inverted plane of the same.
Figure 4:
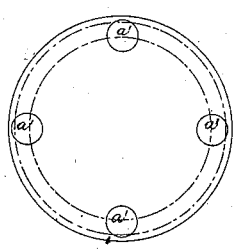
Figures 4 and 5 are inverted planes of the same in other modifications.
Figure 5:
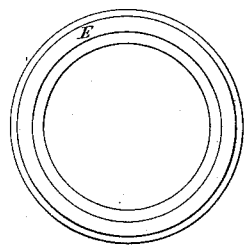

A, fig. 1, represents a bowl made of china-ware. The bottom or rest is provided with a "dove-tail" shaped groove, B, extending entirely around it, as shown by fig. 2. A ring of rubber, C, is so formed that it will project below the groove, and is made thicker than the same that its elasticity may adjust itself tightly in the groove, thereby excluding all moisture and holding it firmly in its proper position. Instead of forming the bowl with a "dove-tail" groove, the bottom may be made with a circular projection, D, as shown on the bottom of the pitcher, and a ring of rubber of proper size stretched over it, as shown in fig. 3; or the bottom may be provided with a number of cavities, a' a' a' a', into which pieces of rubber of proper dimensions are placed, as shown in fig. 4; or the bottom may be supplied with similar elastic rests, E, by attaching the rubber with cement, as shown in figs. 3 and 5, applied to the bottom of the wash-bowl.

What I claim as my invention, and desire to secure by Letters Patent, is—

Furnishing the bottoms of vessels of china, earthen, porcelain, or glass ware with grooves or depressions for the purpose of applying therein elastic rests, substantially as herein shown and described.

ALONZO C. RAND.

Witnesses:
  E. D. PUNDULIN,
  C. L. SHERWOOD.